(No Model.)
J. WHITE.
Toy Cymbal.
No. 238,465. Patented March 1, 1881.
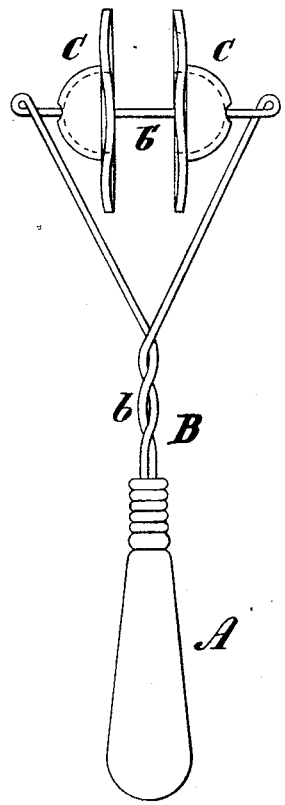
WITNESSES:
S. P. VanStavoren
P. J. McTighe
INVENTOR,
Joseph White,
By Connolly Bro.,
ATTORNEYS

United States Patent Office.

JOSEPH WHITE, OF PHILADELPHIA, PENNSYLVANIA.

TOY CYMBAL.

SPECIFICATION forming part of Letters Patent No. 238,465, dated March 1, 1881.

Application filed February 3, 1881. (No model.)

*To all whom it may concern:*

Be it known that I, JOSEPH WHITE, a citizen of the United States, residing at the city of Philadelphia, in the State of Pennsylvania, have invented certain new and useful Improvements in Toy Cymbals; and I do hereby declare the following to be a full, clear, and exact description of the same, reference being had to the accompanying drawing, forming part of this specification, and which represents an elevation of my invention.

My invention has for its object to provide a bell-toy of simple construction, and which may be manufactured at slight expense, so as to bring it within the reach of the masses of purchasers.

My invention consists of a bell-toy composed of a pair of miniature cymbals, so mounted upon a suitable handle that when the latter is shaken the cymbals will be caused to strike against one another, and thus produce the harmony of sweet bells jangled in tune.

In the drawing, the figure represents a side elevation of the invention.

Referring to the accompanying drawing, A represents a handle, in which are secured the two extremities of a piece of wire, B, said extremities being twisted around one another, so as to strengthen them and to form a stiff shank, $b$. The wire B at its middle portion is bent to form a loop or cord, $b'$, on which are loosely strung two miniature cymbals, C C. When the handle is shaken the cymbals will be caused to rattle or come in contact with one another, as they will slide freely on the wire B.

If desired, the wire B may be twisted to form the handle.

What I claim as my invention is—

The toy herein shown and described, consisting of a pair of cymbals strung or mounted loosely on a cord or loop, and provided with a suitable handle, substantially as shown and described.

In testimony that I claim the foregoing I have hereunto set my hand this 29th day of January, 1881.

JOSEPH WHITE.

Witnesses:
JOHN RODGERS,
M. DANL. CONNOLLY.